United States Patent [19]
Benton et al.

[11] Patent Number: 5,198,480
[45] Date of Patent: Mar. 30, 1993

[54] SUPPRESSANTS FOR UNSATURATED POLYESTER RESINS

[75] Inventors: K. C. Benton, Macedonia; R. Weinert, Garfield Heights, both of Ohio

[73] Assignee: The Standard Oil Company, Cleveland, Ohio

[21] Appl. No.: 800,802

[22] Filed: Nov. 27, 1991

Related U.S. Application Data

[63] Continuation-in-part of Ser. No. 564,266, Aug. 8, 1990, abandoned.

[51] Int. Cl.$^5$ .............................................. C08L 67/02
[52] U.S. Cl. .................... 523/500; 523/504; 523/511; 523/521; 523/522; 524/366; 524/539; 524/755; 524/765; 525/88; 525/437; 525/445; 525/446; 525/447; 525/448
[58] Field of Search ............... 523/500, 504, 511, 521, 523/522; 524/366, 539, 755, 765; 525/88, 437, 445, 446, 447, 448

[56] References Cited

U.S. PATENT DOCUMENTS

| | | | |
|---|---|---|---|
| 4,201,826 | 5/1980 | Nylander | 428/268 |
| 4,218,546 | 8/1980 | Downing et al. | 525/170 |
| 4,269,745 | 5/1981 | Neumann | 524/763 |
| 4,424,299 | 1/1984 | Penczek et al. | 525/31 |
| 4,546,142 | 10/1985 | Walewski | 524/487 |
| 4,559,375 | 12/1985 | Schols et al. | 523/449 |
| 4,692,476 | 9/1987 | Simpson | 521/112 |
| 4,698,411 | 10/1987 | Hill, Jr. et al. | 528/303 |

FOREIGN PATENT DOCUMENTS

| | | |
|---|---|---|
| 2554930 | 6/1977 | Fed. Rep. of Germany . |
| 51-10399 | 4/1976 | Japan . |
| 53-130645 | 11/1978 | Japan . |
| 54-090388 | 7/1979 | Japan . |
| 2102819 | 2/1983 | United Kingdom . |

OTHER PUBLICATIONS

M-TMI, A Novel Unsaturated Aliphatic Isocyanate, vol. 58, No. 7873, Jun. 1986.

Primary Examiner—John Kight, III
Assistant Examiner—S. A. Acquah
Attorney, Agent, or Firm—Larry W. Evans; Teresan W. Gilbert

[57] ABSTRACT

The invention relates to novel suppressants for unsaturated polyester styrenated resins resulting in lower emission of volatile compounds in the production of the polyester resins.

18 Claims, No Drawings

SUPPRESSANTS FOR UNSATURATED POLYESTER RESINS

FIELD OF THE INVENTION

This application is a continuation-in-part of the parent application, Ser. No. 07/564,266, filed Aug. 8, 1990, now abandoned.

The invention relates to novel compounds designated suppressants capable of reducing the evaporation of volatile organic compounds during the processing of unsaturated polyester polymers. The invention further relates to novel materials that are effective suppressants for styrenated polyesters. The invention further relates to suppressants that are incorporated within the unsaturated polyester resin matrix and thus limit the escape of volatile compounds during the curing of fiber-reinforced polyesters. Further, the invention relates to novel suppressant compounds capable of reducing the escape of volatile organic compounds such as styrene into the atmosphere during the curing of hand lay-up/spray-up glass fiber-reinforced polyester (FRP) structures.

BACKGROUND OF THE INVENTION

The fabrication of fiber-reinforced polyester structures, such as boat hulls, by hand lay-up or spray-up of several layers of glass fiber/styrenated polyester composite over a form, called the "open mold" process, has been commercially practiced for many years. The open mold process is practical and relatively inexpensive for the fabrication of large fiber-reinforced polyester structures. However, the open mold process is disadvantageous in that significant amounts of volatile organic compounds escape into the ambient atmosphere creating environmental and health problems.

Recent legislation, in particular California's South Coast Air Quality Management District Rule 1162, restricts the amount of volatiles allowed to escape during the curing of fiber-reinforced polyester. The open mold process requires significant changes to comply with the new regulations. Specifically, the rule restricts volatile emissions to less than 60 g./m.$^2$ as measured by the Standard Method for Static Volatile Emissions (SCAQMD). Compliance with Rule 1162 may be achieved by (1) reducing the styrene content of the polyester resin formulation to less than 35 weight percent, (2) substituting a lower-volatility monomer or comonomer mixture for the styrene or (3) using a suppressant.

Reduction of the styrene content in a polyester resin formulation to less than 35 per cent is disadvantageous for several reasons. Low-styrene formulations suffer from poor wetting characteristics and are difficult to apply to glass fiber reinforcements. Reduced styrene compositions for fiber-reinforced polyesters require the use of polyester oligomers of relatively low molecular weight in order to keep the system viscosity within a usable range, resulting in cured products of inferior physical properties.

Substituting a lower-volatility comonomer for all, or a portion, of the styrene is generally disadvantageous for economic and technological reasons. Substitution monomers such as vinyl toluene, alpha-methylstyrene or para-methylstyrene are generally more expensive than styrene. The substitution monomers yield resin formulations which are slow curing or suffer from incomplete curing under typical ambient curing conditions. Frequently the substitution monomers are not significantly less volatile than similar styrene-based formulations.

Current "suppressed" resin formulations also are disadvantageous. Typical commercial suppressants are wax based products. The wax based products are of a limited compatability with the styrenated polyester resin. The wax based suppressants separate from the system during polymerization or curing, forming a surface layer which serves as a barrier to volatile emissions. The waxy surface layer must be removed prior to painting the fiber-reinforced polyester structure. Further, the weak, waxy layer left on the surface of the polyester resin by current suppressants results in poor secondary bonding characteristics for lamination applications.

It is desirable to lower the emissions of volatile compounds in the production of fiber-reinforced polyester products and to provide strong styrenated polyester resins.

It is an object of this invention to provide suppressants for unsaturated polyester resins, in particular, styrenated polyester resins. It is a further object to provide suppressants so that styrene or styrene/comonomer mixtures can be used at levels in excess of 35 percent of the total composition. It is another object of this invention to provide suppressants for styrenated polyester resins which are capable of being incorporated within the cured resin matrix. It is still another object of this invention is to provide suppressed styrenated polyester resin compositions which exhibit good bonding lamination characteristics and good glass wet-out characteristics.

These and other objects, together with the advantages over known methods shall become apparent from the specification which follows and are accomplished by the invention as hereinafter described and claimed.

SUMMARY OF THE INVENTION

Novel suppressants have been discovered for styrenated polyester resins. It has now been found that polyethers, polyether block copolymers and polyether-polysiloxane block copolymers are novel suppressants for unsaturated polyester polymers. The functional derivatives of each of the three types of materials are also effective suppressants for the styrene polyester resins.

The suppressants of this invention can be used in the production of unsaturated polyesters and fiber-reinforced polyesters. Major uses of styrenated polyester resins are for boats, surfboards, furniture, bathtub and bathtub surrounds, shower stalls, sinks, automobile body panels, curtain wall panels and the like.

DETAILED DESCRIPTION OF THE INVENTION

Suppressants of the instant invention include but are not limited to polyethers, polyether block copolymers and polyether-polysiloxane block copolymers. Additionally, the suppressants may have a functionality capable of participating in free radical polymerization at one or both ends of the suppressant compound.

A functional derivative group capable of participating as a free radical during resin cure is optional on the suppressants. The principal advantage of such a terminal functionality is to confer on the suppressant the capability of being permanently incorporated within the cured resin matrix and enhance the suppressant's resistance to extraction upon exposure to water and solvents. If the suppressant is not copolymerized with the resin it is uncombined at the surface of the resin as a protective barrier. The functional derivatives include but are not limited to vinyls, allyls, styryls, itaconates, fumurates, maleates, isopropenyl phenyl, vinyl benzyl, isopropenyl benzyl, cinnamate, (meth)acryloxy, (meth)acrylamido and the like. The preferred functional derivatives are vinyls, styryls, methacrylates ((meth)acryloxy), (meth)acrylamido, isopropenyl dimethylbenzyl urethane, and the like.

The suppressant can be employed either alone or in combination. The molecular weight of the suppressant is in the range from about 300 daltons to about 25,000 daltons, preferably from about 350 daltons to about 12,000 daltons and most preferably from about 500 daltons to about 5000 daltons. The most effective molecular weight is dependent on the compositions of both the suppressant and the unsaturated polyester resin.

The suppressants include but are not limited to polyethers in particular poly-(ethylene glycols) (PEG) having at least five oxyethylene units, poly-(propylene glycols) (PPG), monoalkoxy-poly-(propylene glycols), monomethoxy-poly(ethylene glycols) (MPEG) having at least five oxyethylene units and the like; polyether block copolymers in particular poly-(ethylene glycol)-poly-(propylene glycol) block copolymers (PEG-b-PPG), and the like; and polyether-polysiloxane block copolymers, in particular poly-(alkylsiloxane)-polyether block copolymers, poly-(alkylarylsiloxane)-polyether block copolymers, and the like. Vinyl functional derivatives of the polymers include but are not limited to polyoxyethylene maleate half-acid esters of five or more oxyethylene units, in particular monoalkoxy poly-(ethylene glycols) of five or more oxyethylene units, poly-(dimethylsiloxane)-polyether block copolymers (PDMS-b-polyethylene glycol/polypropylene glycol) and the like.

Preferred suppressants include poly(ethylene glycol) of at least five oxyethylene units, poly(propylene glycol), monomethoxy-poly(ethylene glycols) of at least five oxyethylene units, poly(ethyelene glycol)-b-poly(-propylene glycol) and poly-(dimethylsiloxane)-polyether block copolymers.

The suppressant is used in the range from about 0.05 to about 5.0 parts by weight per one hundred parts of the resin formulation (phr). The preferred level of suppressant is in the range from about 0.1 to about 4.0 phr.

The styrene or styrene and comonomer mixture is in the range from about 20% to about 45% and preferably in the range from about 30% to about 38% of the resin formulation. The unsaturated polyester resin is in the range from about 80% to about 55% of the resin formulation.

In the practice of the invention the styrenated polyester resins are prepared by conventional methods known in the art, see, J. Selley, *Encyclopedia of Polymer Science and Engineering*, 2nd Edition, Vol. 12, pp 256-290 (John Wiley & Sons, New York, 1988). Generally, the unsaturated polyester oligomer is dissolved in styrene, styrene and a comonomer mixture or a comomer mixture. An initiator, such as a peroxide, is added to the prefabrication resin to make the solid resin. The suppressant is added to the resin formulation before the initiator is added to the resin formulation. The suppressant is added to the resin formulation at a resin temperature below 90° C. It will be readily apparent to one skilled in the art that the prefabrication resin may be further modified by the addition of promoters, inhibitors, thixotropic agents, plasticizers, stabilizers, pigments, dispersants, defoamers, surfactants, extenders, fillers, reinforcing agents, film formers, flattening agents, uv light absorbers, flow control agents, viscosity modifiers, antioxidants, dyes and the like. The use of the additives does not require extensive discussion, it being understood that any compound possessing the ability to function in such a manner can be used as long as it does not deleteriously affect the characteristics of the resin. It will be appreciated, therefore, that the resin, suppressant and any other additive should be chemically compatible with each other.

The invention is further illustrated by the following examples, although it is understood that the examples are intended merely for purposes of illustration and are not intended to limit the scope of the invention.

SPECIFIC EMBODIMENTS

The following examples demonstrate the process and advantages of the present invention.

EVALUATION TECHNIQUES

All compositions are in parts by weight, unless otherwise stated.

A. Small-Scale Volatility Test

About 35 to 37 grams of cobalt-promoted styrenated polyester resin to be tested is weighed into a 50-ml. polyethylene beaker. To the resin is added sufficient, about 1 to 2 phr of methyl ethyl ketone peroxide (MEKP) (initiator/catalyst) to produce the desired gel time of about 10 to 30 minutes. The methyl ethyl ketone peroxide is mixed with the resin for about 60 seconds using a wooden tongue depressor.

Two aluminum pans about 2-inch in diameter are tared on a balance. Into each pan is weighed about 13.2-13.4 g. of the catalyzed polyester resin. The time, $t_0$, is taken as the conclusion of the weighing of the first sample. The samples are allowed to stand quiescent on the laboratory bench top at the ambient temperature, typically 72° F. to 74° F., and relative humidity of about 35% to 65%.

The excess catalyzed resin is used for the determination of the gel point. The gel point, $t_{gel}$, is defined as that point at which it is no longer possible to draw a filament from the polymerizing mass with the wooden tongue depressor. Resin gel time is varied by the fabricator, by adjusting the amount of MKEP, to an internal appropriate for ambient temperature, size of the structure and the like. $T_{gels}$ of less than 10 minutes or greater than 30 minutes are usually unsatisfactory because of handling problems.

The samples are weighed again at about 60 minutes after the gel point ($t_{gel}+60'$). The weight loss over the period $t_0$ to $t_{gel}+60'$ is calculated as the percent of the total sample weight and hereafter designated % VOC @ $t_{gel}+60'$. The weight loss shows there is evaporation of the styrene or comonomer mixture.

B. "Can-Lid" Volatility Test

The lid of a 1-gallon paint can is inverted and tared on a balance. About 110 g to 120 g of the polyester/styrene resin to be tested, is weighed into about a 250-ml. polyethylene beaker. Sufficient methyl ethyl ketone peroxide, of about 1 to 2 phr is added to the resin to produce the desired gel time of usually about 10 to 30 minutes and then the methyl ethyl ketone peroxide is mixed with the resin for about 60 seconds using a wooden tongue depressor. About 100±0.1 g. of the catalyzed polyester styrene resin is poured into the can lid. The conclusion of the weighing of the sample is designated as $t_0$. The gel point is determined as described above in part A. The sample is weighed at the gel point and at about 15-minute intervals until two successive readings are the same. The weight loss over this period is used to calculate the VOC in g./m.$^2$, as follows:

Sample Area = $3.1416 \times (0.073)^2 = 0.01674$ m.$^2$

VOC, g./m.$^2$ = (Wt. Loss)/0.01674

C. Secondary Bonding Test

Glass mat was cut into approximately 6 inch × 6 inch squares. Three squares were weighed and sufficient styrenated polyester resin was then weighed into a polyethylene beaker to make a 3-ply laminate with about 25% glass by weight. Sufficient methyl ethyl ketone peroxide was added to the styrenated polyester resin to provide a gel time of approximately 15 minutes and was then mixed in for about 60 seconds using a wooden tongue depressor.

A quantity of the catalyzed styrenated polyester resin was spread on about a 12 inch × 12 inch sheet of 5-mil Mylar ™ film (available from DuPont) using a 2 inch paint brush. The first ply of glass mat was worked into the styrenated polyester resin, using the paint brush, until it was thoroughly wetted with the resin. Additional resin was brushed over the first ply and a second ply of glass mat was then worked into the additional resin with the brush. A third ply was then built up in the same manner. Approximately one-third of the catalyzed resin was retained and poured over the third ply and leveled off with a brush. The laminate was then placed in a circulating air oven and cured at approximately 40 deg-C for about 48 hours. The laminate was then removed from the oven and allowed to cool to ambient temperature.

A strip of 10-mil Mylar ™ film covering about 1 inch of the sample was placed along one edge of the laminate. A second 3-ply laminate was then fabricated over the first, using the same technique as described above. The second laminate was placed in a circulating air oven and cured for about 24 hours at about 40 deg-C. The sample was then removed from the oven and allowed to cool to ambient temperature.

Approximately 0.75 inch was trimmed from each edge of the laminate. The laminate was then pried apart from the non-bonded area protected by the Mylar ™ strip. The secondary bonding was judged to be "good" if, upon visual inspection, it appeared that at least 50% of the exposed surface was covered by glass fiber.

Preparation of Polyether Block Copolymer Suppressant (Designated Suppressant A)

In a 4-oz. wide-mouth jar were placed about 35.16 g of a PEG-b-PPG block copolymer of molecular weight 3438 and 3:1 mole ratio of PPG to PEG and about 4.16 g. of meta-isopropenyl dimethylbenzyl isocyanate (TMI) The components were mixed on a roll mill until a homogeneous solution was obtained. To this solution was added about 0.52 g. dibutyltin dilaurate and the system was mixed on the roll mill at ambient temperature of about 72° F. for about 96 hours. Infrared spectroscopic analysis of the suppressant, designated A, indicated that no residual isocyanate was present and supported the formation of the desired isopropenyl dimethylbenzyl urethane-terminated block copolymer.

EXAMPLE 1

Resin SPE-3 + Suppressant A

To a cobalt-promoted styrenated polyester, designated SPE-3, composed of about 39.7 parts styrene and about 60.3 parts of a polyester oligomer made up of about 32.1 mole % o-phthalate, about 17.1 mole % fumarate, about 0.3 mole % maleate, and about 50.5 mole % PG, was added 2.1 parts of the suppressant A. The formulation with suppressant A exhibited a VOC of 1.16% ($t_{gel}$=10 min.), compared with 1.33% VOC ($t_{gel}$=11.5 min.) for the SPE-3 with no suppressant. This demonstrates that suppressant A reduces the evaporation of the volatile styrene.

EXAMPLE 2

Resin SPE-3 + Suppressant B

To a sample of SPE-3 (see Example 1 for composition) was added about 2.0 parts of a butoxy-terminated PPG-b-poly-(dimethylsiloxane) [PDMS] block copolymer of molecular weight 3000 (suppressant B) and the components were mixed until homogeneous. The resulting suppressed SPE-3 exhibited a VOC of 1.05% ($t_{gel}$=10 min.), compared with a VOC of 1.33% ($t_{gel}$=11.5 min.) for the base SPE-3. This demonstrates that the suppressant reduces the evaporation of the volatile styrene.

EXAMPLE 3

Resin SPE-4 + Suppressant C

A cobalt-promoted styrenated polyester, designated SPE-4, was prepared by dissolving about 62.5 parts of polyester oligomer PE-3, composed of about 33 mole % o-phthalate, about 16 mole % fumarate, about mole % maleate, about 33 mole % PG and about 17 mole % diethylene glycol (DEG) in about 37.5 parts styrene containing about 0.25 part about 6% cobalt (II) napthenate and approximately 150 ppm hydroquinone monomethyl ether (MEHQ). To a portion of this composition was added about 1.0 part of a hydroxy-terminated PEG-b-PDMS block copolymer of molecular weight 4000 (suppressant C) and the components were mixed until a homogeneous solution was obtained. The suppressed SPE-4 exhibited very good secondary bonding characteristics and a VOC of 48.8 g./m.$^2$ ($t_{gel}$=14 min.) in the "can lid" test, compared with 72.3 g./m.$^2$ ($t_{gel}$=14 min.) for the base SPE-4 that was not suppressed. This demonstrates that the suppressant reduces the evaporation of the volatile styrene.

EXAMPLE 4

Resin SPE-5, SPE-6, SPE-7 and Suppressant

Styrenated polyester resins designated SPE-5 through SPE-7 were prepared by dissolving about 63.5 parts of polyester oligomer PE-3 in about 36.5 parts of a 9:1 w/w mixture of, respectively, styrene:paramethylstyrene (p-MS), styrene:n-butyl methacrylate (n-BuMA), and styrene:poly-(caprolactone acrylate) [Union Carbide Tone ™ M-100] containing 1.0 part of the hydroxy-terminated PEG-b-PDMS block copolymer (suppressant C), about 0.25 part 6% cobalt (II) naphthenate and about 150 160 ppm MEHQ. The formulations were subject to the small-scale volatility test the results of which demonstrate the suppression of emissions from polyester resin-styrene-comonomer systems and which are shown in Table I, below.

TABLE I

| | SPE-5 | SPE-6 | SPE-7 |
|---|---|---|---|
| Component | | | |
| Polyester Oligomer PE-3 | 63.5 | 63.5 | 63.5 |
| Styrene | 32.9 | 32.8 | 32.8 |
| para-Methylstyrene | 3.6 | — | — |
| n-Butyl Methacrylate | — | 3.7 | — |
| Tone ™ M-100 | — | — | 3.7 |
| Polymerization | | | |
| MEKP, phr | 1.50 | 1.50 | 1.50 |
| $t_{gel}$, min. | 15 | 18 | 17 |
| % VOC@$t_{gel}$ + 60' | 1.08 | 1.07 | 0.99 |

EXAMPLE 5

Resin SPE-1 and Suppressant D

A styrenated polyester resin, designated SPE-1, was prepared, consisting of about 35.6% styrene and about 64.4% of a polyester oligomer PE-1, composed of about 30.0 mole % o-phthalate, about 13.7 mole % fumarate, about 0.3 mole % maleate and about 56 mole % propylene glycol. To a portion of this formulation in a 4-oz. glass bottle was added about 2.1 phr of the maleate half-ester of about a 750 molecular weight methoxy poly(ethylene glycol) [about 16 oxyethylene units] (designated suppressant D). The mixture was agitated for approximately 18 hours to thoroughly disperse the suppressant B in the resin.

When subjected to the small-scale volatility test, it was found that the SPE-1 incorporating the suppressant D exhibited a VOC of 1.22% ($t_{gel}$=35 min.), compared with a VOC of 1.60% ($t_{gel}$=37 min.) for the SPE-1 base composition. This demonstrates that the use of the suppressant B with the resin reduces the evaporation of the volatile organics i.e. styrene.

EXAMPLE 6

Resin SPE-3+Suppressant D

A cobalt-promoted styrenated polyester resin, designated SPE-3, was prepared by dissolving about 35.6 parts of a polyester oligomer, PE-2 composed of about 25 mole % isophthalate, about 7 mole % terephthalate, about 23 mole % fumarate and about 50 mole % PG in about 64.6 parts of styrene. To a portion of SPE-3 was added 2.0 phr suppressant D and the composition was mixed thoroughly to ensure dispersion of the suppressant. When subjected to the small-scale volatility test, it was found that the SPE-3 containing the suppressant D had a VOC of 0.78% ($t_{gel}$=22 min.), compared with a VOC of 1.61% ($t_{gel}$=26 min.) for the base SPE-3. This demonstrates that the suppressant lowers the volatility of the resin.

Preparation of Polyoxyethylene Half-Ester Suppressant (Designated Suppressant E)

About a 100 ml. reaction tube was equipped with a 4-port head fitted with a gas inlet tube and thermometer, magnetic spinbar for agitation and electric heating mantle. The apparatus was set on a magnetic stirring plate and was charged with about 100.10 g. of methoxypoly(ethylene glycol) of molecular weight approximately 550 daltons [about 11-12 oxyethylene units] and about 17.85 g. of maleic anhydride. The reaction mixture was blanketed with nitrogen and heated to about 150° C. in about 35 minutes. The temperature was then maintained at about 147° C. to 149° C.

Samples were withdrawn at selected intervals and dissolved in 2:1 v/v ethanol water and titrated with 0.1N methanolic potassium hydroxide to the phenolphthalein endpoint. The acid number was calculated as the milligrams of potassium hydroxide required to neutralize one gram of sample.

The reaction was terminated after about 212 minutes. The final acid number was 93.3. The product, designated suppressant E and was composed of 52 mole % maleate half-ester, 2 mole % maleate diester, 4 mole % fumarate half-ester, 29 mole % unreacted MPEG550, and 12 mole % unreacted maleic anhydride, by $^1$H-NMR spectroscopic analysis.

EXAMPLE 7

Resin SPE-2+Suppressant D, E and F

To separate portions of a styrenated polyester resin, SPE-2, composed of about 33% styrene and about 67% of the polyester oligomer PE-1, were added 4.0 phr suppressant D, 4.1 phr suppressant E and 4.0 phr suppressant F which is maleate half-ester of a 2000 molecular weight MPEG [about 44-45 oxyethylene units], respectively. The mixtures were agitated vigorously for approximately 18 hours to thoroughly disperse the suppressants in the SPE-2.

The samples were subjected to the small-scale volatility test. The results of the small-scale volatility test are shown in Table II; they clearly demonstrate that the formulations containing the MPEG maleate half-esters are significantly less volatile than the SPE-2 with no suppressant.

TABLE II

| Suppressant | $t_{gel}$, min. | % VOC@$t_{gel}$ + 60 |
|---|---|---|
| None | 28 | 1.07 |
| D | 27 | 0.90 |
| E | 25 | 0.45 |
| F | 24 | 0.62 |

Preparation of Poly(Dimethyl Siloxaul)-Poly(ethylene glycol) Block Copolymer Terminated With a Functional Derivative (Designated Suppresant G)

In a 4 oz. wide-mouth jar were placed about 35.78 g. of the hydroxy terminated PEG-b-PDMS block copolymer of molecular weight 4000 and about 1.80 g. TMI. The components were mixed on a roll mill until a homogeneous solution was obtained. About 0.23 g dibutyltin dilaurate was added to the solution and the composition was mixed on a roll mill for about 96 hours at ambient temperature. The infrared spectrum of the product, suppressant G, supported the formation of the m-isopropenyl dimethylbenzyl urethane-terminated PEG-b-PDMS block copolymer.

EXAMPLE 8

Resin SPE-4+Suppressant G

To a portion of styrenated polyester, designated SPE-4, was added about 0.25 phr of the product suppressant G and the components were mixed until homogeneous. In the can lid test, the SPE-4/suppressant G formulation exhibited a VOC of 55.1 g./m.$^2$ ($t_{gel}$=13 min.), compared with a VOC of 72.3 g./m.$^2$ ($t_{gel}$=14 min.) for SPE-4 alone. This demonstrates low volatility using the suppressant G.

COMPARATIVE EXAMPLES

A styrenated polyester base resin formulation was prepared by diluting a commercial high-solids poly-(propylene o-phthalate/fumarate) polyester, Silmar S40T [Lot No. 263951, 28.5 wt. % styrene], with sufficient additional styrene to yield a solution composed of 42% styrene and 58% polyester, and adding to this solution 0.25 parts per 100 parts of resin (phr) of a 6% cobalt naphthenate solution and 100 ppm. p-methoxyphenol. One portion of this solution was kept as a control sample To four separate aliquots of the resin solution were added, respectively, 2.0 phr 2-methoxyethanol (MEG), 2.0 phr diethylene glycol (DEG), 2.0 phr monomethoxy-poly-(ethylene glycol) of MW=350 (MPEG350 about 7 oxyethylene units), and 2.0 phr monomethoxy-poly-(ethylene glycol) of MW=550 (MPEG550 about 11-12 oxyethylene units). Vinyl derivatives were not employed as it was not necessary to provide for permanent incorporation of the suppressant for the purposes of these examples.

Each of the five formulations was subjected to the can-lid test, the results of which are shown in Table III below.

TABLE III
VOC EMISSIONS OF STYRENATED POLYESTERS FORMULATIONS CONTAINING ETHYLENE GLYCOL OLIGOMERS

| Run No. | Composition | T (°F.) | RH (%) | $t_{gel}$ (min.) | VOC g./m.$^2$) |
|---|---|---|---|---|---|
| 59-3 | Control | 77.5 | 50 | 14.5 | 102.2 |
| 57A2 | Control + MEG | 77 | 57 | 13.5 | 103.9 |
| 60-2 | Control + DEG | 78 | 46 | 15 | 105.1 |
| 57B2 | Control + MPEG 350 | 78 | 46 | 14.5 | 98.6 |
| 57C2 | Control + MPEG 550 | 77 | 56 | 14 | 93.2 |

The minor differences in temperature and gel times in these experiments do not affect the measured VOC to a significant degree.

The data demonstrates that only the ethylene glycol oligomers of 7 or more oxyethylene units reduce styrene emissions during the curing of these resin formulations.

Although the invention has been described in detail through the proceeding examples, these examples are for purposes of illustration only and it is understood that variations and modifications can be made by one skilled in the art without departing from the spirit and scope of the invention.

What we claim is:

1. A suppressant for unsaturated polyester resins comprising a polyether, polyether block copolymer, polyether-polysiloxane block copolymer and combinations thereof and wherein the polyethylene glycol suppressant has seven or more oxyethylene units and wherein the suppressant has a molecular weight in the range from about 300 daltons to about 25,000 daltons and wherein the resulting material substantially reduces styrene emission or volatile organic emission.

2. The suppressant according to claim 1 wherein the suppressant contains a functional derivative selected from the group consisting of vinyls, allyls, styryls, itaconate, fumurate, maleate, isopropenyl phenyl, vinyl benzyl, isopropenyl dimethyl benzyl, cinnamate, (meth)acryloxy, (meth)acrylamido and combinations thereof.

3. The suppressant of claim 1 wherein the suppressant is selected from the group consisting of poly-(ethylene glycols) having at least seven oxyethylene units, poly-(propylene glycols), monoalkoxy-poly-(propylene glycol), monomethoxy-poly(ethylene glycols) having at least seven oxyethylene units, poly-(ethylene glycol)-poly-(propylene glycol) block copolymers, poly-(alkylsiloxane)-polyether block copolymers, poly-(alkylarylsiloxane)-polyether block copolymers, poly-(dimethylsiloxane)-polyether block copolymer and combinations thereof.

4. The suppressant of claim 3 wherein the suppressant is selected from the group consisting of poly(ethylene glycol) having at least seven oxyethylene units, poly(-propylene glycol), monomethoxy-poly(ethylene glycol) having at least seven oxyethylene units, poly(ethylene glycol)-b-poly(propylene glycol), poly-(dimethylsiloxane)-polyether block copolymer and combinations thereof.

5. The suppressant of claim 2 wherein the functional derivative is selected from the group consisting of vinyls, styryls, methacrylates((meth)acryloxy), (meth)acrylamido, isopropenyl dimethylbenzyl urethane and combinations thereof.

6. The suppressant of claim 1 wherein the suppressant has a molecular weight with the range from about 350 daltons to about 12,000 daltons.

7. The suppressant of claim 1 wherein the molecular weight is in the range from about 500 daltons to about 5,000 daltons.

8. The suppressant of claim 1 wherein the suppressant is present in the range from about 0.05 to about 5.0 parts by weight per 100 parts of the resin formulation.

9. The suppressant of claim 1 wherein the suppressant is present in the range from about 0.1 to about 4.0 parts by weight per 100 parts of the resin formulation.

10. The suppressant of claim 1 wherein styrene or styrene and comonomer mixture is employed in the range from about 20 percent to about 45 percent by weight of the resin formulation.

11. The suppressant of claim 1 wherein styrene or styrene comonomer mixture is employed in the unsaturated polyester resin in the range from about 30 percent to about 38 percent of the resin formulation.

12. An unsaturated polyester resin comprising about 80 percent to about 55 percent unsaturated polyester resin, about 20 percent to about 45 percent styrene or styrene comonomer mixture and about 0.05 percent to 5.0 percent of a suppressant selected from the group consisting of polyether, polyether block copolymer, polyether-polysiloxane block copolymer and combinations thereof, and wherein the polyether has seven or more oxyethylene units, and wherein the suppressant has a molecular weight in the range from about 300 daltons to about 25,000 daltons, and wherein the resulting material substantially reduces styrene emission or volatilve organic emission.

13. An unsaturated polyester resin comprising a solution of an unsaturated polyester resin in a volatile monomer selected from the group consisting of styrene or styrene and comonomer mixture, the improvement comprising incorporating a suppressant selected from the group consisting of polyethers, polyether block copolymers, polyether-polysiloxane block copolymers, a functional derivative thereof and combinations thereof, and wherein the polyether has seven or more oxyethylene units, and wherein the suppressant has a molecular weight in the range from about 300 daltons to about 25,000 daltons, and wherein the resulting material substantially reduces styrene emission, and whereby organic volatile vapor emission is substantially reduced.

14. The unsaturated polyester resin according to claim 13 wherein the suppressant is present in the range from 0.05 to about 5.0 parts by weight per 100 parts of the resin formulation.

15. The unsaturated polyester resin according to claim 14 wherein the suppressant is present in the range from 0.1 to about 4.0 parts by weight per 100 parts of the resin formulation.

16. The unsaturated polyester resin according to claim 14 wherein the volatile monomer of styrene or styrene comonomer mixture is in the range from about 20 percent to about 45 percent by weight of the resin formulation.

17. The unsaturated polyester resin according to claim 14 wherein the volatile monomer of styrene or styrene comonomer mixture is in the range from about 30 percent to about 38 percent by weight of the resin formulation.

18. A suppressant for unsaturated polyester resins comprising a polyether, polyether block copolymer, polyether-polysiloxane block copolymer and combinations thereof; and wherein the suppressant is selected from the group consisting of poly-(ethylene glycols) having at least seven oxyethylene units, poly-(propylene glycols), monoalkoxy-poly-(propylene glycol), monomethoxy-poly(ethylene glycols) having at least seven oxyethylene units, poly-(ethylene glycol)-poly-(propylene glycol) block copolymers, poly-(alkylsiloxane)-polyether block copolymers, poly-(alkylarylsiloxane)-polyether block copolymers, poly-(dimethylsiloxane)-polyether block copolymer and combinations thereof; and wherein the suppressant has a molecular weight in the range from about 300 daltons to about 25,000 daltons; and wherein the resulting material substantially reduces styrene emission or volatile organic emission. s t

* * * * *